US012803761B2

(12) United States Patent
Shao et al.

(10) Patent No.: US 12,803,761 B2
(45) Date of Patent: Nov. 17, 2026

(54) METHODS AND SYSTEMS FOR ENHANCED TRANSMISSION CONFIGURATION INDICATOR FRAMEWORK

(71) Applicant: ZTE Corporation, Shenzhen (CN)

(72) Inventors: Shijia Shao, Shenzhen (CN); Bo Gao, Shenzhen (CN); Shujuan Zhang, Shenzhen (CN); Ke Yao, Shenzhen (CN); Yang Zhang, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 297 days.

(21) Appl. No.: 18/520,403

(22) Filed: Nov. 27, 2023

(65) Prior Publication Data

US 2024/0097863 A1 Mar. 21, 2024

Related U.S. Application Data

(63) Continuation of application No. PCT/CN2022/080112, filed on Mar. 10, 2022.

(51) Int. Cl.
*H04L 5/00* (2006.01)
*H04W 72/23* (2023.01)

(52) U.S. Cl.
CPC ........... *H04L 5/0091* (2013.01); *H04W 72/23* (2023.01)

(58) Field of Classification Search
None
See application file for complete search history.

(56) References Cited

U.S. PATENT DOCUMENTS 11,425,745 B2 * 8/2022 Cirik .................... H04W 72/53
11,974,270 B2 * 4/2024 Matsumura ........... H04L 5/0051
(Continued)

FOREIGN PATENT DOCUMENTS

CN 117413486 A 1/2024
EP 3958630 A1 2/2022
(Continued)

OTHER PUBLICATIONS

JPO, Notice of Allowance for Japanese Application No. 2023-573383, mailed on Mar. 24, 2025, 5 pages with unofficial English translation.

(Continued)

*Primary Examiner* — Otis L Thompson, Jr.
(74) *Attorney, Agent, or Firm* — Ashurst Perkins Coie US LLP

(57) ABSTRACT

Methods and systems for techniques for enhancement of transmission configuration indicator framework in wireless networks are disclosed. In an implementation, a method of wireless communication includes: receiving, by a wireless device, from a network device, a first parameter indicated by a first signaling message; determining, by the wireless device, a mapping relationship between a plurality of transmission configuration states and a plurality of group information according to the first parameter; receiving, by the wireless device, an indication of whether the transmission configuration states are activated according to at least one first signaling message; receiving, by the wireless device, an indication of the plurality of transmission configuration states according to a second signaling message; and applying, by the wireless device, the plurality of transmission configuration states to a transmission.

16 Claims, 12 Drawing Sheets

(56) References Cited

U.S. PATENT DOCUMENTS

| | | | | |
|---|---|---|---|---|
| 12,677,172 | B2 * | 7/2026 | Määttänen | H04W 24/08 |
| 2020/0015200 | A1 * | 1/2020 | Vilaipornsawai | H04W 72/23 |
| 2021/0105778 | A1 * | 4/2021 | Zhou | H04W 52/242 |
| 2021/0352705 | A1 * | 11/2021 | Kang | H04W 72/1273 |
| 2021/0352706 | A1 * | 11/2021 | Kang | H04L 5/0044 |
| 2021/0359745 | A1 * | 11/2021 | Farag | H04L 1/0071 |
| 2022/0022192 | A1 * | 1/2022 | Sakhnini | H04B 7/06952 |
| 2022/0046438 | A1 * | 2/2022 | Lo | H04B 7/06964 |
| 2022/0061069 | A1 * | 2/2022 | Yang | H04W 72/232 |
| 2022/0077982 | A1 * | 3/2022 | Zhang | H04L 5/0053 |
| 2022/0141881 | A1 * | 5/2022 | Bai | H04W 56/0015 370/329 |
| 2022/0191892 | A1 * | 6/2022 | Muruganathan | H04W 72/23 |
| 2022/0217742 | A1 * | 7/2022 | Kim | H04L 5/0044 |
| 2022/0239423 | A1 * | 7/2022 | Zhu | H04L 5/0023 |
| 2024/0014880 | A1 * | 1/2024 | Svedman | H04B 7/06968 |
| 2024/0314804 | A1 * | 9/2024 | Liu | H04L 5/0053 |

FOREIGN PATENT DOCUMENTS

| | | | |
|---|---|---|---|
| EP | 4344466 | A1 | 4/2024 |
| WO | 2020143909 | A1 | 7/2020 |
| WO | 2021035423 | A1 | 3/2021 |
| WO | 2021205409 | A1 | 10/2021 |

OTHER PUBLICATIONS

IP Office Australia, Second Examination Report for Australian Application No. 2022445874, mailed on Jun. 11, 2025, 3 pages.

IP Office Australia, Notice of Acceptance for Australian Application No. 2022445874, mailed on Aug. 1, 2025, 3 pages.

Extended European Search Report from European Patent Application No. 22930290.6 dated Jul. 2, 2024. 14 pages.

Futurewei, "Enhancement on multi-beam operation," 3GPP TSG RAN WG1 Meeting #105-e, e-Meeting, May 19-May 27, 2021, R1-2104205, 2021.

VIVO, "Further discussion on multi beam enhancement," 3GPP TSG RAN WG1 #106-e e-Meeting, Aug. 16-27, 2021, R1-2106571, 2021.

IP Australia, First Examination Report for Australian Application No. 2022445874, mailed on Jul. 25, 2024, 3 pages.

JPO, Office Action for Japanese Application No. 2023-573383, mailed on Nov. 1, 2024, 4 pages with machine English translation.

ZTE, "Further details on Multi-beam and Multi-TRP operation," 3GPP TSG RAN WG1 Meeting #106bis-e, e-Meeting, R1-2108877, Oct. 11-19, 2021, 16 pages.

ZTE, "Further details on Multi-beam and Multi-TRP operation," 3GPP TSG RAN WG1 Meeting #106-e, e-Meeting, R1-2106548, Aug. 16-27, 2021, 17 pages.

Qualcomm Incorporated, "Correction on new DL MIMO MAC CE," 3GPP TSG-RAN WG2 Meeting #109bis-e, Electronic, R2-2003252, Apr. 20-30, 2020, 10 pages.

Qualcomm Incorporated, "Enhanced TCI States Activation/ Deactivation PDSCH MAC CE for Multi-TRP," 3GPP TSG-RAN WG2 Meeting #107bis, Reno, USA, R2-1916066, Nov. 18-22, 2019, 3 pages.

International Search Report for International Application No. PCT/ CN2022/080112, Mail Date: Dec. 16, 2022. 10 pages.

Futurewei, "Enhancement on multi-beam operation" 3GPP TSG RAN WG1 Meeting #103-e e-Meeting, Oct. 26-Nov. 13, 2020, R1-2007546, sections 2.1, 2.2, 2.3, 3 and figs 1,2.

Lenovo, "Enhancements on Multi-beam Operation," 3GPP TSG RAN WG1#103-e e-Meeting, Oct. 26-Nov. 13, 2020, R1-2008910, sections 2.1.

Intel Corporation, "Enhancements on Multi-Beam Operation," 3GPP TSG RAN WG1 #103-e e-Meeting, Oct. 26-Nov. 13, 2020, R1-2008977, sections 5, 6.

Samsung, "Multi-beam enhancements," 3GPP TSG RAN WG1 #103-e e-Meeting, Oct. 26-Nov. 13, 2020, R1-2008148, sections 2.3, 4.3 and fig 13.

AT&T, "Summary of UE features for further enhancements on NR-MIMO," 3GPP TSG RAN WG1 #107bis-e, e-Meeting, Jan. 17-25, 2022, R1-2200765.

Ericsson, "On Rel-17 FeMIMO," 3GPP TSG-RAN WG2 #116-e, Electronic meeting, Nov. 1-12, 2021, R2-2110341.

Nec, "Discussion on remaining issues on multi-beam operation," 3GPP TSG RAN WG1 #108-e, e-Meeting, Feb. 21-Mar. 3, 2022, R1-2201896.

Nokia, MIMO Enhanceents for Rel-18, RAN Rel-18 Workshop, Jun. 28 to Jul. 2, 2021, RWS-210075.

Oppo, "Implementation of MIMO RRC parameters," 3GPP TSG-RAN WG2 #116bis, E-meeting, Jan. 2022, R2-2100260, R2-2200260.

Samsung, "Moderator summary for multi-beam enhancement , "3GPP TSG RAN WG1 #106bis-e, e-Meeting, Oct. 11-19, 2021, R1-2109466.

Samsung, "Moderator summary#2 for multi-beam enhancement: Round 1," GPP TSG RAN WG1 #106bis-e, e-Meeting, Oct. 11-19, 2021, R1-2110492.

Vivo, "Remaining issues on multi beam enhancement," 3GPP TSG RAN WG1 #107-e, e-Meeting, Nov. 11-19, 2021, R1-2110990.

Vivo, "Further discussion on multi beam enhancement," 3GPP TSG RAN WG1 #106b-e e-Meeting, Oct. 11-19, 2021, R1-2108951.

ZTE, "Further details on Multi-beam and Multi-TRP operation," 3GPP TSG RAN WG1 Meeting #107-e, e-Meeting, Nov. 11-19, 2021, R1-2110955.

* cited by examiner

| | | |
|---|---|---|
| Codepoint #1 | TCI state #1 for TRP 1 | TCI state #1 for TRP 2 |
| Codepoint #2 | Only one TCI state (a single TCI with no indication as to which TRP will apply the TCI state) | |

FIG. 4

| | | | | |
|---|---|---|---|---|
| Codepoint #1 | DL TCI for TRP 1 | UL TCI for TRP 1 | DL TCI for TRP 2 | UL TCI for TRP 2 |
| Codepoint #2 | DL TCI for TRP 1 | UL TCI for TRP 1 | Only one TCI state (there is a single TCI – no indication as to which of DL and UL will apply the TCI state) | |
| Codepoint #3 | Only one TCI state (a single TCI with no indication as to which of DL and UL will apply the TCI state) | | Only one TCI state (a single TCI with no indication as to which of DL and UL will apply the TCI state) | |
| Codepoint #4 | Only one TCI state (a single TCI with no indication as to which TRP and which of DL and UL will apply the TCI state) | | | |

FIG. 7

METHODS AND SYSTEMS FOR ENHANCED TRANSMISSION CONFIGURATION INDICATOR FRAMEWORK

CROSS REFERENCE TO RELATED APPLICATIONS

This patent document is a continuation of and claims benefit of priority to International Patent Application No. PCT/CN2022/080112, filed on Mar. 10, 2022. The entire content of the before-mentioned patent application is incorporated by reference as part of the disclosure of this application.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for enhancement of transmission configuration indicator framework in wireless networks.

In one aspect, a method of data communication is disclosed. The method includes receiving, by a wireless device, from a network device, a first parameter indicated by a first signaling message; determining, by the wireless device, a mapping relationship between a plurality of transmission configuration states and a plurality of sets of group information according to the first parameter; receiving, by the wireless device, an indication of whether the transmission configuration states are activated according to at least one first signaling message; receiving, by the wireless device, an indication of the plurality of transmission configuration states according to a second signaling message; and applying, by the wireless device, the plurality of transmission configuration states to a transmission.

In another aspect, a method of data communication is disclosed. The method includes configuring, by a network device, a plurality of transmission configuration indicator states for beam indication corresponding to a plurality of sets of group information, respectively; transmitting, by the network device, to a wireless device, a signaling message to indicate a mapping relationship between the plurality of transmission configuration indicator states for beam indication and the plurality of sets of group information according to the signaling message; and performing a communication between the network device and the wireless device using the plurality of sets of group information.

In another example aspect, a wireless communication apparatus comprising a processor configured to implement an above-described method is disclosed.

In another example aspect, a computer storage medium having code for implementing an above-described method stored thereon is disclosed.

These, and other, aspects are described in the present document.

BRIEF DESCRIPTION OF THE DRAWING

FIG. 4 shows examples of activated codepoints based on some implementations of the disclosed technology.

FIG. 7 shows examples of codepoints based on some implementations of the disclosed technology.

DETAILED DESCRIPTION

Section headings are used in the present document only for ease of understanding and do not limit scope of the embodiments to the section in which they are described. Furthermore, while embodiments are described with reference to 5G examples, the disclosed techniques may be applied to wireless systems that use protocols other than 5G or 3GPP protocols.

A multi-TRP (multiple transmission and reception points) approach uses multiple transmission and reception points (TRPs) to effectively improve the transmission throughput in the long term evolution (LTE), long term evolution-advanced (LTE-A) and new radio access technologies (NR) in enhanced mobile broadband (eMBB) scenarios. In addition, the use of multi-TRP transmission or reception can effectively reduce the probability of information blockage and improve the transmission reliability in ultra-reliability and low latency communication (URLLC) scenarios.

According to the mapping relationship between the transmitted signal flow and multi-TRP/panels, the coordinated multiple points transmission/reception can be divided into two types: (1) coherent transmission; and (2) non-coherent transmission. For a coherent transmission, each data layer is mapped to multiple-TRPs/Panels through weighted vectors. However, in the actual deployment environment, this mode has higher requirements for synchronization between TRPs and the transmission capability of backhaul links, and is sensitive to many non-ideal factors.

In contrast, a non-coherent joint transmission (NCJT) is less affected by the above factors. Therefore, NCJT is a major consideration in R15 Coordinated Multiple Points Transmission/Reception. NCJT means that each data flow is only mapped to the port corresponding to the TRP/Panel with the same channel large-scale parameters (QCL). Different data flows can be mapped to different ports with different large-scale parameters, and all TRPs do not need to be processed as a virtual array.

Unified TCI framework was introduced in Rel-17 to unify uplink and downlink transmission configuration indicator (TCI) state indication modes. That is, the spatial relation and power control parameters for uplink transmission are replaced by TCI states. However, the current framework is only applicable to a single set of group information (e.g., single transmission and reception point STRP) scenario. Therefore, the enhancement for multiple sets of group information (e.g., multiple transmission and reception points MTRP) unified TCI framework should be further studied.

Figure 1:
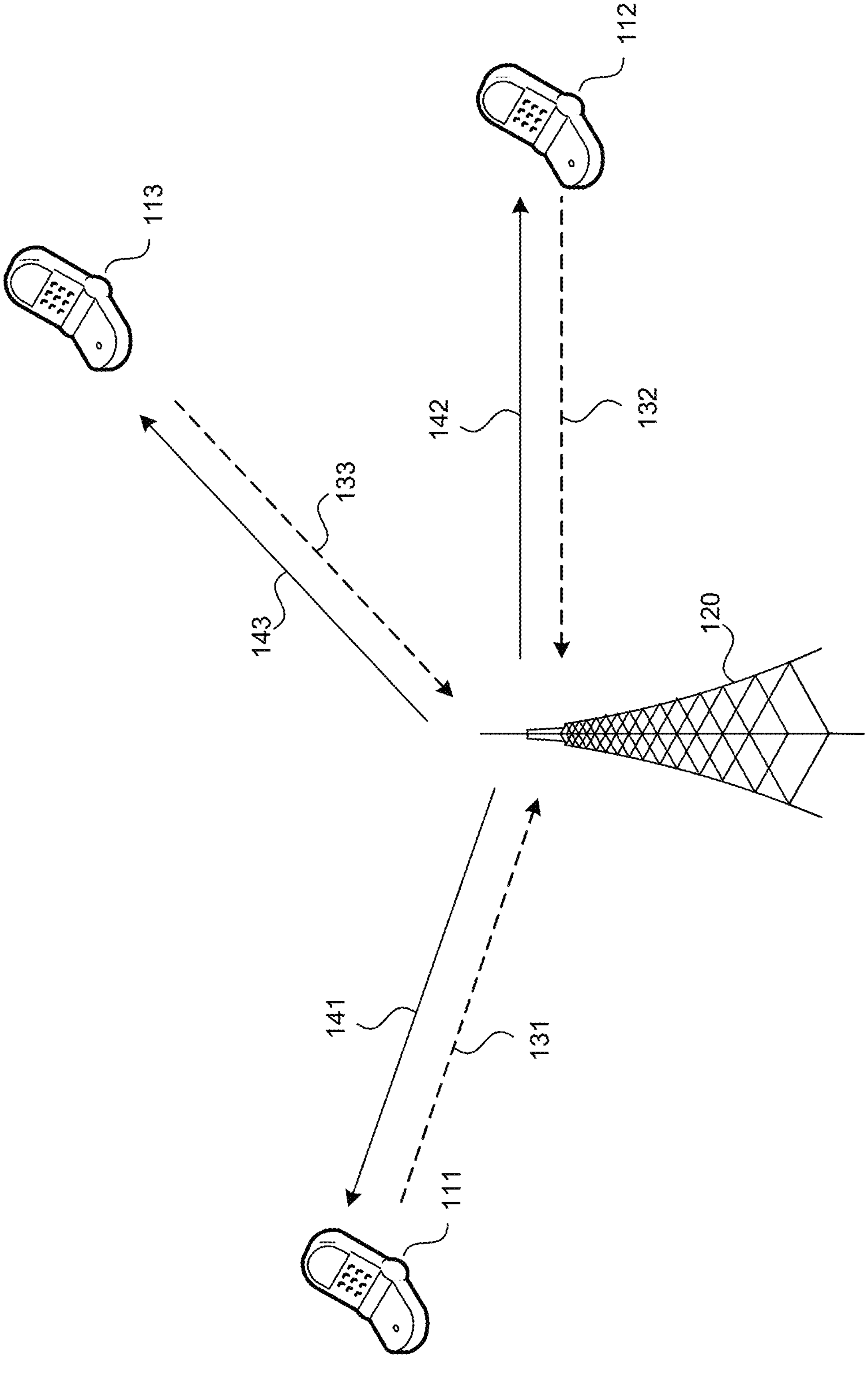
FIG. 1 shows an example of a wireless communication system based on some example embodiments of the disclosed technology.

FIG. 1 shows an example of a wireless communication system (e.g., a long term evolution (LTE), 5G or NR cellular network) that includes a BS 120 and one or more user equipment (UE) 111, 112 and 113. In some embodiments, the uplink transmissions (131, 132, 133) can include uplink control information (UCI), higher layer signaling (e.g., UE assistance information or UE capability), or uplink information. In some embodiments, the downlink transmissions (141, 142, 143) can include DCI or high layer signaling or downlink information. The UE may be, for example, a smartphone, a tablet, a mobile computer, a machine to machine (M2M) device, a terminal, a mobile device, an Internet of Things (IoT) device, and so on.

Figure 2:
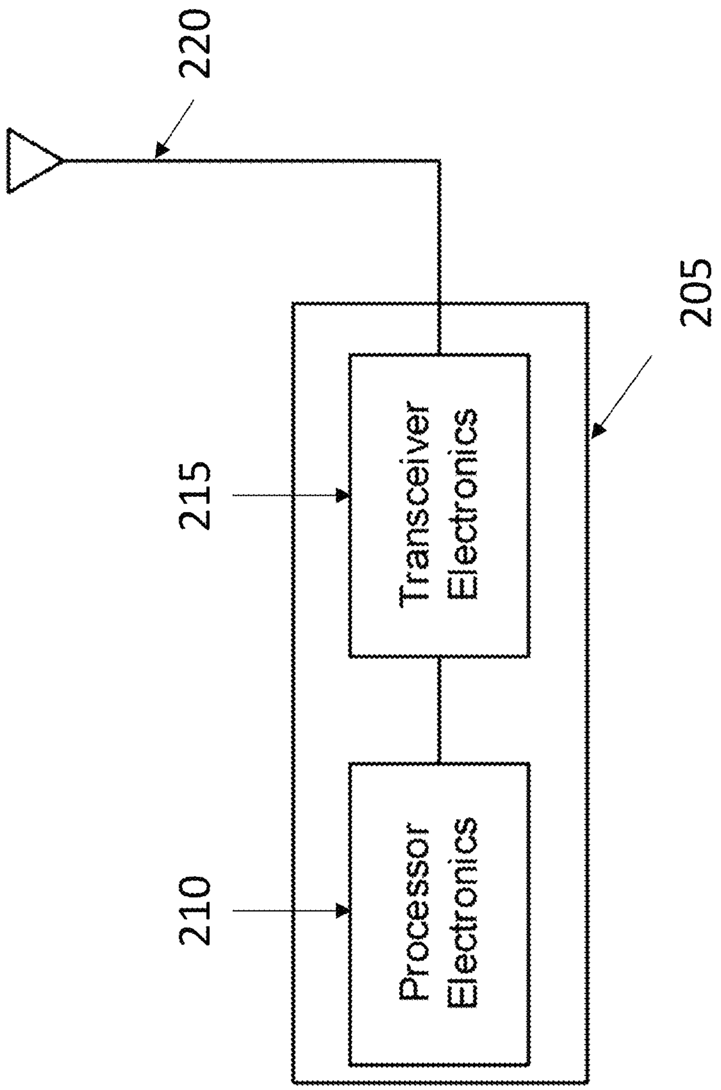
FIG. 2 is a block diagram representation of a portion of an apparatus based on some embodiments of the disclosed technology.

FIG. 2 is a block diagram representation of a portion of an apparatus based on some embodiments of the disclosed technology. An apparatus 205 such as a network device or a base station or a wireless device (or UE), can include processor electronics 210 such as a microprocessor that implements one or more of the techniques presented in this document. The apparatus 205 can include transceiver electronics 215 to send and/or receive wireless signals over one or more communication interfaces such as antenna(s) 220. The apparatus 205 can include other communication interfaces for transmitting and receiving data. Apparatus 205 can include one or more memories (not explicitly shown) configured to store information such as data and/or instructions. In some implementations, the processor electronics 210 can include at least a portion of the transceiver electronics 215. In some embodiments, at least some of the disclosed techniques, modules or functions are implemented using the apparatus 205.

In some embodiments of the disclosed technology, the term "beam" indicates quasi-co-location (QCL) state, transmission configuration indicator (TCI) state, spatial relation state (also referred to as spatial relation information state), reference signal (RS), spatial filter or pre-coding.

In some embodiments of the disclosed technology, the term "Tx beam" indicates QCL state, TCI state, spatial relation state, DL/UL reference signal (such as channel state information reference signal (CSI-RS), synchronization signal block (SSB) (which is also referred to as SS/PBCH), demodulation reference signal (DMRS), sounding reference signal (SRS), and physical random access channel (PRACH)), Tx spatial filter or Tx precoding.

In some embodiments of the disclosed technology, the term "Rx beam" indicates QCL state, TCI state, spatial relation state, spatial filter, Rx spatial filter or Rx precoding.

In some embodiments of the disclosed technology, the term "beam ID" indicates QCL state index, TCI state index, spatial relation state index, reference signal index, spatial filter index or precoding index.

In some embodiments of the disclosed technology, the spatial filter can be either UE-side or gNB-side one, and the spatial filter can also be referred to as spatial-domain filter.

In some embodiments of the disclosed technology, "spatial relation information" includes one or more reference RSs, which is used to represent "spatial relation" between targeted "RS or channel" and the one or more reference RSs, where "spatial relation" indicates the same/quasi-co beam(s), same/quasi-co spatial parameter(s), or same/quasi-co spatial domain filter(s).

In some embodiments of the disclosed technology, "spatial relation" indicates the beam, spatial parameter, or spatial domain filter.

In some embodiments of the disclosed technology, "QCL state" includes one or more reference RSs and their corresponding QCL type parameters, where QCL type parameters include at least one of the following aspect or combination: (1) Doppler spread; (2) Doppler shift; (3) delay spread; (4) average delay; (5) average gain; and (6) spatial parameter (which is also referred to as spatial Rx parameter).

In some embodiments of the disclosed technology, the term "TCI state" indicates "QCL state."

In some embodiments of the disclosed technology, "QCL-TypeA" indicates {Doppler shift, Doppler spread, average delay, delay spread}, "QCL-TypeB" indicates {Doppler shift, Doppler spread}, "QCL-TypeC" indicates {Doppler shift, average delay}, and "QCL-TypeD" indicates {Spatial Rx parameter}.

In some embodiments of the disclosed technology, "UL signal" can be PRACH, PUCCH, PUSCH, UL DMRS, or SRS.

In some embodiments of the disclosed technology, "DL signal" can be PDCCH, PDSCH, SSB, DL DMRS, or CSI-RS.

In some embodiments of the disclosed technology, a group based reporting includes at least one of "beam group" based reporting and "antenna group" based reporting.

In some embodiments of the disclosed technology, the term "beam group" indicates that different Tx beams within one group can be simultaneously received or transmitted, and/or Tx beams between different groups may not be simultaneously received or transmitted. Furthermore, the definition of "beam group" is described from the UE perspective.

In some embodiments of the disclosed technology, the term "BM RS" indicates a beam management reference signal, such as CSI-RS, SSB or SRS.

In some embodiments of the disclosed technology, the term "BM RS group" indicates "grouping one or more BM reference signals," and BM RSs from a group are associated with the same TRP.

In some embodiments of the disclosed technology, the term "TRP-ID" indicates "TRP index" used to distinguish different TRPs.

In some embodiments of the disclosed technology, the term "panel ID" indicates UE panel index.

In some embodiments of the disclosed technology, the term "group information" indicates "information grouping one or more reference signals," "transmission and reception point (TRP)," "resource set," "panel," "sub-array," "antenna group," "antenna port group," "group of antenna ports," "beam group," "physical cell index (PCI)," "TRP index," "CORESET pool ID," or "UE capability set."

Embodiment 1: Association Between TCI States and Group Information Such as TRPs

In Rel-17, a unified TCI framework includes both downlink/uplink (DL/UL) common pool and separate pool. TCI states in a common pool can be indicated for downlink transmission or uplink transmission or both downlink and uplink transmission. However, TCI states from a DL separate pool can be only indicated for downlink transmissions. In addition, TCI states from a UL separate pool can be only indicated for uplink transmissions.

Figure 3:
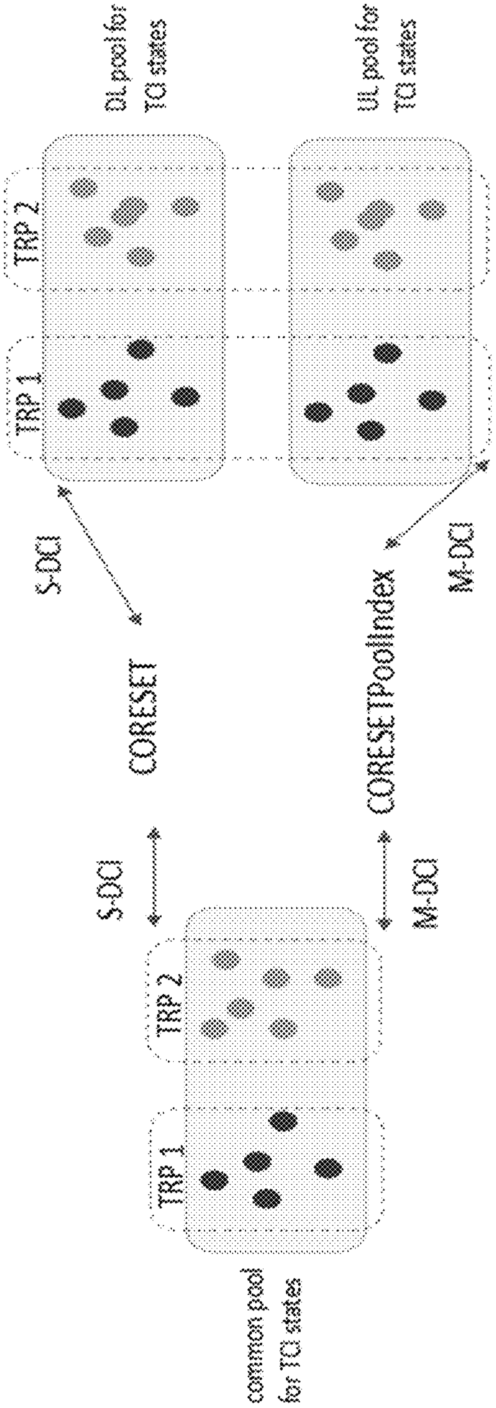
FIG. 3 shows a relationship between transmission configuration indicator (TCI) states and group information.

FIG. 3 shows a relationship between transmission configuration indicator (TCI) states and group information.

To apply the R17 unified TCI framework to multiple sets of group information (e.g., MTRP) scenarios, UE should be aware of which group information the configured TCI corresponds to. As such, UE should be aware of the association between TCI states and group information (e.g., TRPs), as shown in FIG. 3.

In some implementations, the relationship or the association between TCI states and TRPs can be indicated by Radio Resource Control (RRC) or Medium Access Control (MAC) Control Element (MAC-CE).

For an RRC indication, gNB can configure N TCI state sub-pools/pools corresponding to N sets of group information (e.g., N TRPs), respectively, and the association between TCI states and group information (e.g., TRPs) can be indicated by a parameter in each sub-pool/pool.

For a MAC-CE indication, N MAC-CEs can be used to activate TCI state codepoint(s) corresponding to N sets of group information (e.g., N TRPs), respectively. The association between TCI states and group information (e.g., TRPs) can be indicated by a parameter in each MAC-CE.

In a multiple-DCI scenario, UE is provided with two coresetPoolIndex values 0 and 1 for the first and second CORESETs, or is not provided with coresetPoolIndex value for the first CORESETs and is provided with coresetPoolIndex value of 1 for the second CORESETs, respectively. Therefore, coresetPoolIndex can be used as the parameter.

In a single-DCI scenario, UE is not provided coresetPoolIndex for the first and second CORESETs, a new ID, such as TCI state pool ID/TRP-ID, can be introduced as the parameter. Furthermore, the new ID can also be used for a multiple-DCI scenario.

In some implementations, implicit indices for the association, such as UE capability index, physical cell index (PCI), CSI-RS resource set index, SRS resource set index, can be used. Furthermore, the UE capability comprises the number of antenna ports (e.g., SRS antenna ports), the number of layers (e.g., for PUSCH, or PDSCH), or the UE panel ID/index.

In some implementations, some physical channels and TCI states can be associated according to a direct indication such as the parameter, such as CORESET/PDCCH, PUCCH resource (group), Type 1 PDSCH Transmission with a Configured Grant, Type 1 PUSCH Transmission with a Configured Grant, and some physical channels and TCI states can be associated according to an indirect indication such as CORESET/PDCCH indication, such as Type 2 PDSCH Transmission with a Configured Grant, Type 2 PUSCH Transmission with a Configured Grant, Scheduled PDSCH/PUSCH, PRACH, aperiod CSI-RS/SRS.

Embodiment 2: MAC-CE Activation

In Rel-17, a unified TCI framework includes both DL/UL joint indication and separate indication. For a joint indication, a TCI state in a TCI codepoint can be used for both DL and UL transmissions. For a separate indication, a TCI state in a TCI codepoint can be used for DL transmissions only or UL transmissions only, or a pair of TCI states in a TCI codepoint can be used for DL and UL transmissions, respectively. Joint and separate indications can be configured by RRC.

Only One MAC-CE

Joint Indication

FIG. 4 shows examples of activated codepoints based on some implementations of the disclosed technology.

For 2 sets of group information (e.g., 2 TRPs) scenario, one TCI codepoint can include a maximum of two TCI states. The two TCI states will apply to 2 sets of group information (e.g., 2 TRPs), respectively.

In some implementations of the disclosed technology, a default matching rule can be used. For example, the first TCI state will apply to the group information (e.g., TRP) with the lowest index, and the second TCI state will apply to the group information (e.g., TRP) with the second lowest index and so on.

In some implementations of the disclosed technology, a flag can be used to indicate explicitly.

If one TCI codepoint includes only one TCI state, UE cannot be aware of which group information (e.g., TRP) should apply the TCI state configured in the codepoint, as shown in line 2 in FIG. 4.

In some implementations of the disclosed technology, a flag can be used to indicate explicitly which group information (e.g., TRP) the TCI state corresponds to.

Figure 5:
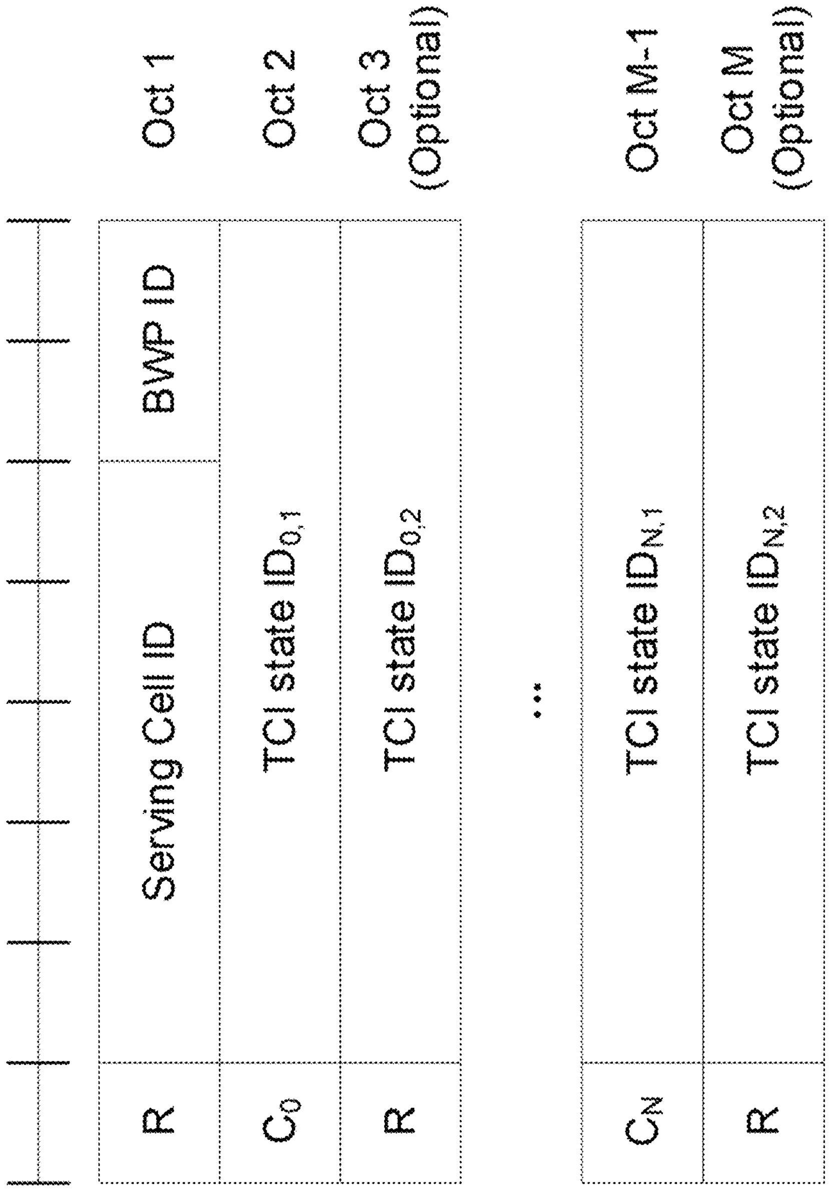
FIG. 5 shows an example of enhanced TCI state activation and deactivation for UE-specific Physical Downlink Shared Channel (PDSCH) MAC-CE.

FIG. 5 shows an example of enhanced TCI state activation and deactivation for UE-specific Physical Downlink Shared Channel (PDSCH) MAC-CE.

Figure 6:
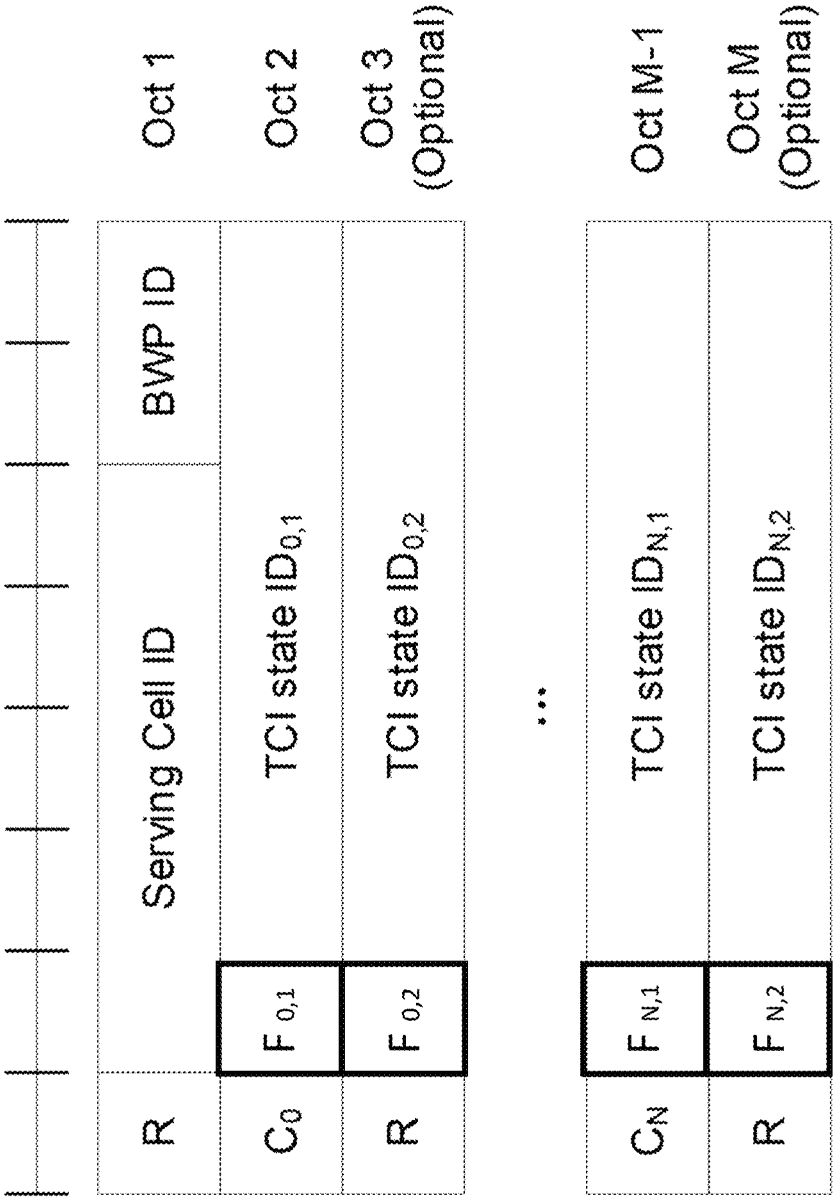
FIG. 6 shows an example of a flag for indicating each TCI state based on some implementations of the disclosed technology.

FIG. 6 shows an example of a flag for indicating each TCI state based on some implementations of the disclosed technology.

In some implementations of the disclosed technology, in order to enhance the unified TCI framework, a flag, such as "F" field shown in FIG. 6, can be used to indicate which group information (e.g., TRP) the TCI will apply to.

Separate Indication

FIG. 7 shows examples of activated codepoints based on some implementations of the disclosed technology.

For 2 sets of group information (e.g., 2 TRPs) scenario, one TCI codepoint can include a maximum of 4 TCI states. Those 4 TCI states will apply to 2 sets of group information (e.g., 2 TRPs) and DL transmissions and UL transmissions, respectively.

In some implementations of the disclosed technology, a default matching rule can be used. For example, the first TCI state will apply to the group information (e.g., TRP) with the lowest index and DL transmission, and the second TCI state will apply to the group information (e.g., TRP) with the lowest index and DL transmission, and the second TCI state will apply to the group information (e.g., TRP) with the second lowest index and DL transmission.

In some implementations of the disclosed technology, a flag can be used to indicate explicitly.

In some implementations, the flag may include two indicators that can be used for group information (e.g., TRP) indication and uplink/downlink indication, respectively.

In some implementations, the flag may include only one indicator that is used for group information (e.g., TRP) indication. For DL/UL indication, UE can determine the TCI state application for DL or UL according to an implicit indication, such as an index of TCI states in DL/UL TCI state pool.

In some implementations, the indices of reference signals configured in the downlink and uplink pools are different.

If one TCI codepoint only include less than 4 TCI states, UE cannot be aware of which group information (e.g., TRP) or which transmission direction should apply the TCI state (s) configured in the codepoint, as shown in lines 2-4 in FIG. 7.

In some implementations, a flag is used to indicate explicitly.

In some implementations, the flag may include two indicators that can be used for group information (e.g., TRP) indication and uplink/downlink indication, respectively.

In some implementations, the flag may include only one indicator that is used for group information (e.g., TRP) indication. For DL/UL indication, UE can determine the TCI state application for DL or UL according to an implicit indication, such as an index of TCI states in DL/UL TCI state pool.

In some implementations, the indices of reference signals configured in the downlink and uplink pools are different.

Two or More MAC-CE

Figure 8:
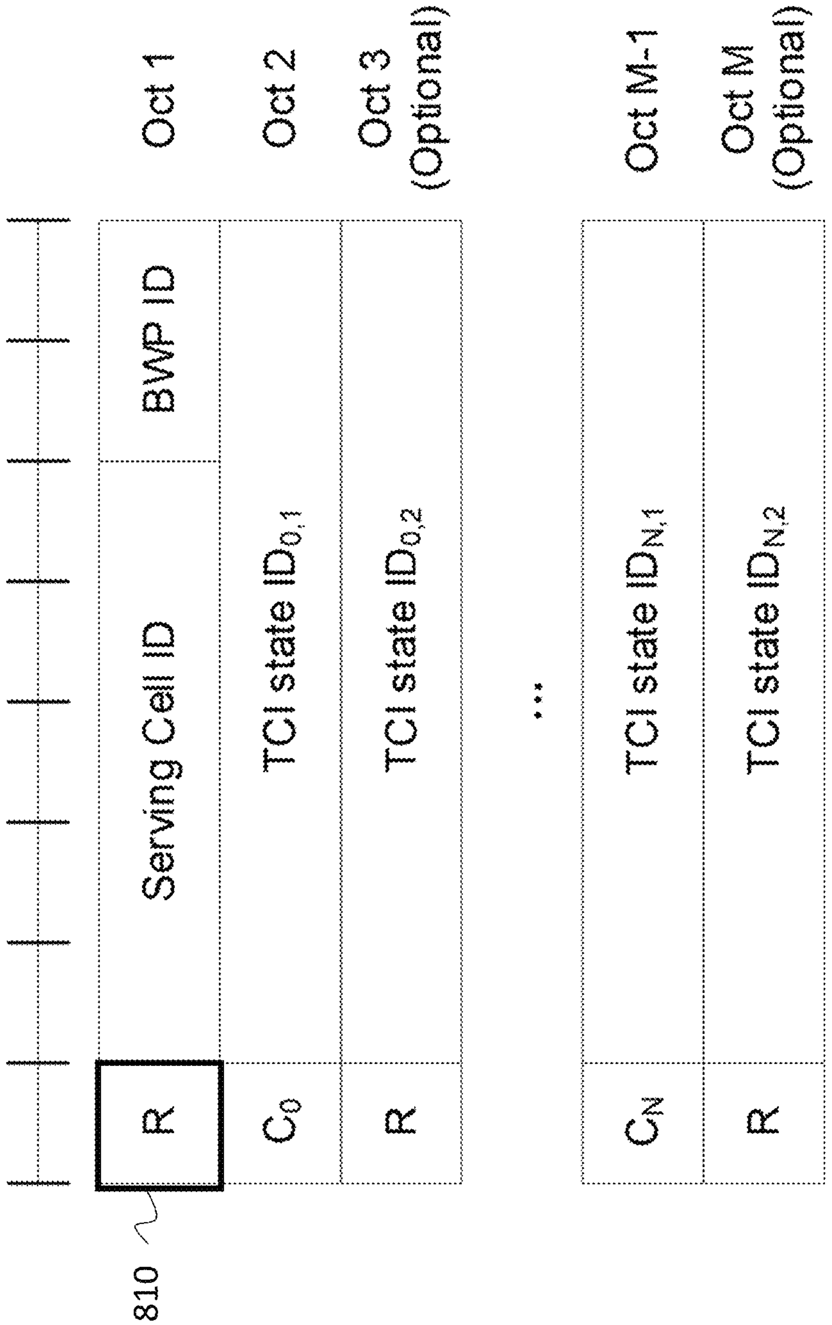
FIG. 8 shows an example of a field for indicating a relationship between MAC-CE and group information based on some implementations of the disclosed technology.

FIG. 8 shows an example of a field for indicating a relationship between MAC-CE and group information (e.g., TRP) based on some implementations of the disclosed technology.

In some implementations of the disclosed technology, each MAC-CE corresponds to one set of group information (e.g., TRP), and R field (810) in FIG. 8 can be used to indicate the relationship between MAC-CE and group information (e.g., TRP), as described in Embodiment 1.

Joint Indication

Figure 9:
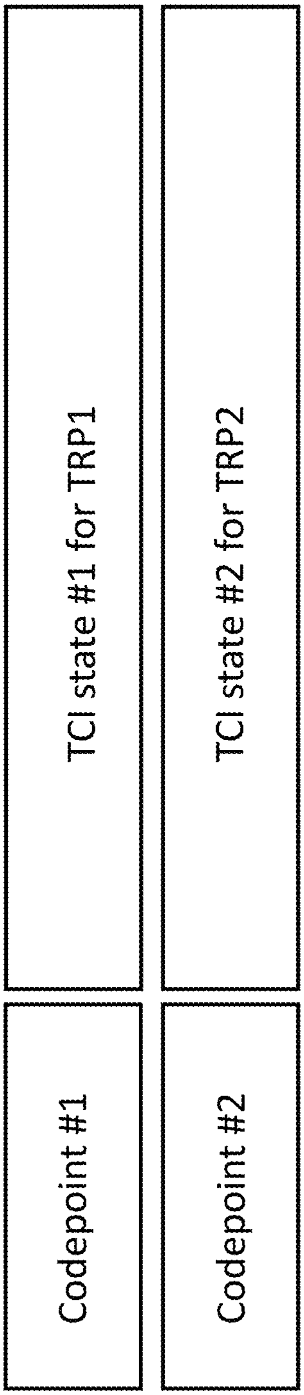
FIG. 9 shows examples of codepoints where each TCI codepoint includes only one TCI state based on some implementations of the disclosed technology.

FIG. 9 shows examples of codepoints where each TCI codepoint includes only one TCI state based on some implementations of the disclosed technology.

In some implementations of the disclosed technology, one TCI codepoint can only contain one TCI state.

Separate Indication

Figure 10:
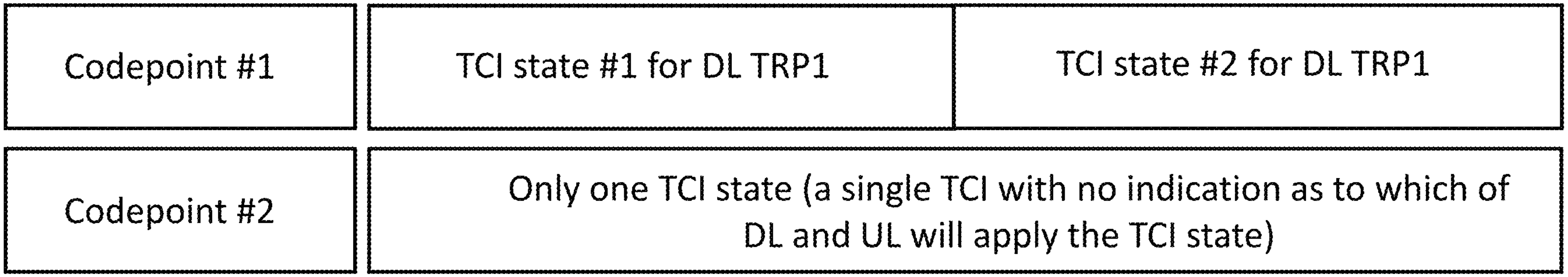
FIG. 10 shows examples of codepoints based on some implementations of the disclosed technology.

FIG. 10 shows examples of codepoints based on some implementations of the disclosed technology.

In some implementations, one TCI codepoint can include a maximum of 2 TCI states. The 2 TCI states will apply to DL transmissions and UL transmissions, respectively.

In some implementations, a default matching rule can be used. In one example, the first TCI state will apply to the group information (e.g., TRP) for DL transmission, and the second TCI state will apply to the group information (e.g., TRP) for UL transmission.

In some implementations, a flag can be used to indicate explicitly.

In some implementations, if one activated TCI codepoint includes only one TCI state, UE cannot be aware of which transmission direction (e.g., downlink or uplink transmission) should apply the TCI state(s) configured in the codepoint, as shown in FIG. 10.

In some implementations, a flag can be used to indicate explicitly.

In some implementations, UE can determine the TCI state application for DL or UL according to an implicit indication, such as an index of TCI states in DL/UL TCI state pool.

In some implementations, the indices of reference signals configured in the downlink and uplink pools are different.

Embodiment 3: DCI Indication

For unified TCI framework, DCI indicates one TCI state codepoint based on activated TCI state codepoints. If only one codepoint in MAC-CE, no need for a DCI.

Only One DCI Field Used for Indication

For multiple sets of group information (MTRP) scenarios, to maintain flexibility the restriction that the maximum number of activated TCI codepoint is 8 should be extended.

"Transmission Configuration Indication" field can be reused, and the field should be extended to be greater than 3 bits.

In some implementations, if DCI indicates one codepoint only contain TCI state(s) corresponding to one set of group information (e.g., one TRP), UE can perform the following operations:

(1) Mode 1: UE can switch multiple sets of group information (e.g., MTRP) to single set of group information (e.g., STRP)

(2) Mode 2: UE keeps multiple sets of group information (e.g., MTRP) mode and only updates TCI state for associated group information (e.g., TRP).

In some implementations, the mode discussed above can be configured by RRC.

N DCI Fields Used for Indication

For multiple sets of group information (e.g., MTRP) scenarios, N DCI fields can be used for N sets of group information (e.g., N TRPs).

In some implementations, the other fields (except the existing "Transmission Configuration Indication" field) can use the fields reserved in R17 unified TCI framework by DCI. In one example, whether another field exists can be configured by RRC.

Figure 11:
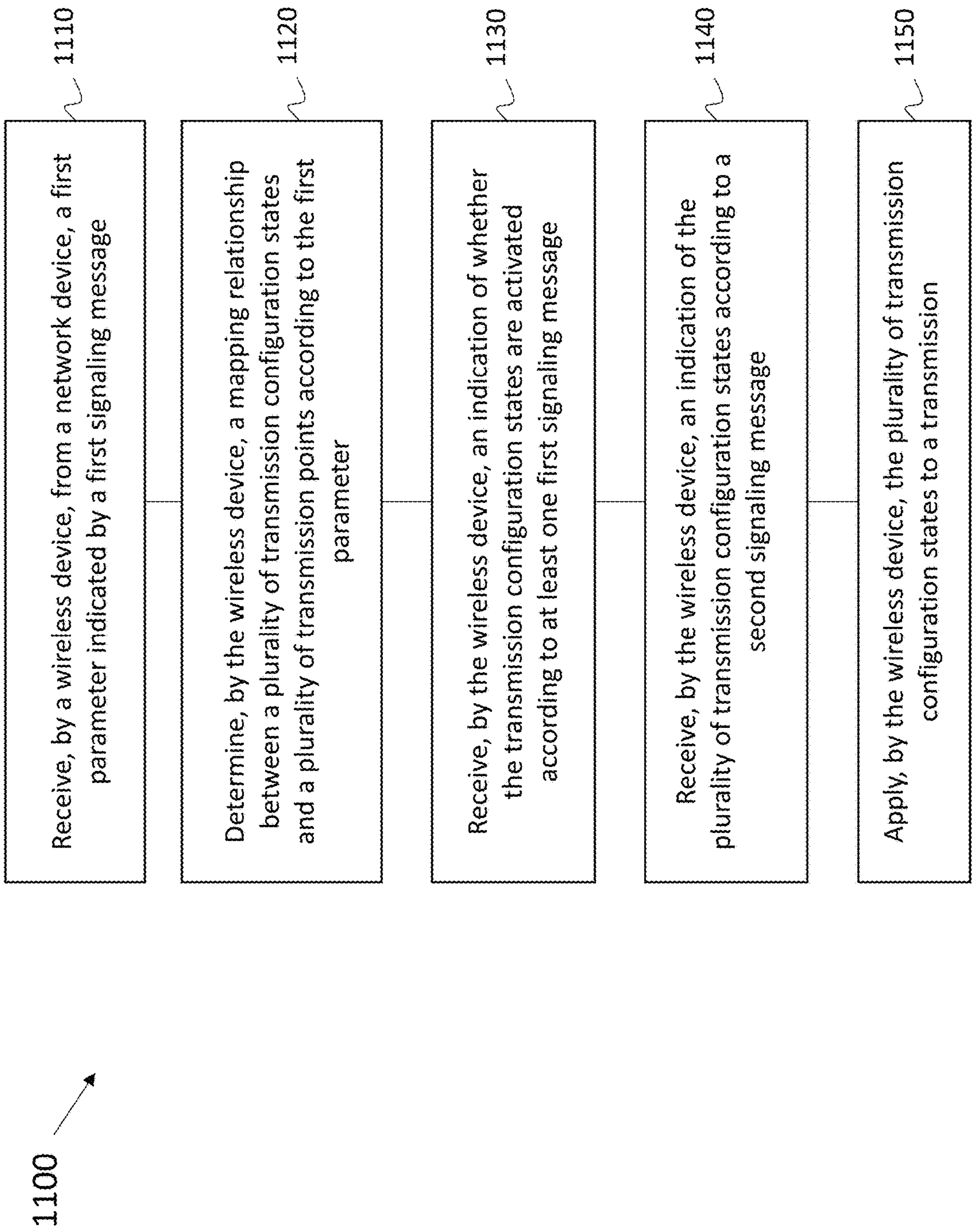
FIG. 11 shows an example of a process for wireless communication based on some example embodiments of the disclosed technology.

FIG. 11 shows an example of a process for wireless communication based on some example embodiments of the disclosed technology.

In some implementations, the process 1100 for wireless communication may include, at 1110, receiving, by a wireless device, from a network device, a first parameter indicated by a first signaling message, at 1120, determining, by the wireless device, a mapping relationship between a plurality of transmission configuration states and a plurality of sets of group information (e.g., TRP) according to the first parameter, at 1130, receiving, by the wireless device, an indication of whether the transmission configuration states are activated according to at least one first signaling message, at 1140, receiving, by the wireless device, an indication of the plurality of transmission configuration states according to a second signaling message, and at 1150, applying, by the wireless device, the plurality of transmission configuration states to a transmission.

In some implementations, the plurality of transmission configuration states includes transmission configuration indicator (TCI) states.

In some implementations, the first signaling message includes a radio resource control (RRC) message or a medium access control (MAC) control element (MAC-CE) message.

In some implementations, the second signaling message includes a downlink control information (DCI) signaling that includes a first field to indicate a codepoint that includes one or more transmission configuration indicator states.

Figure 12:
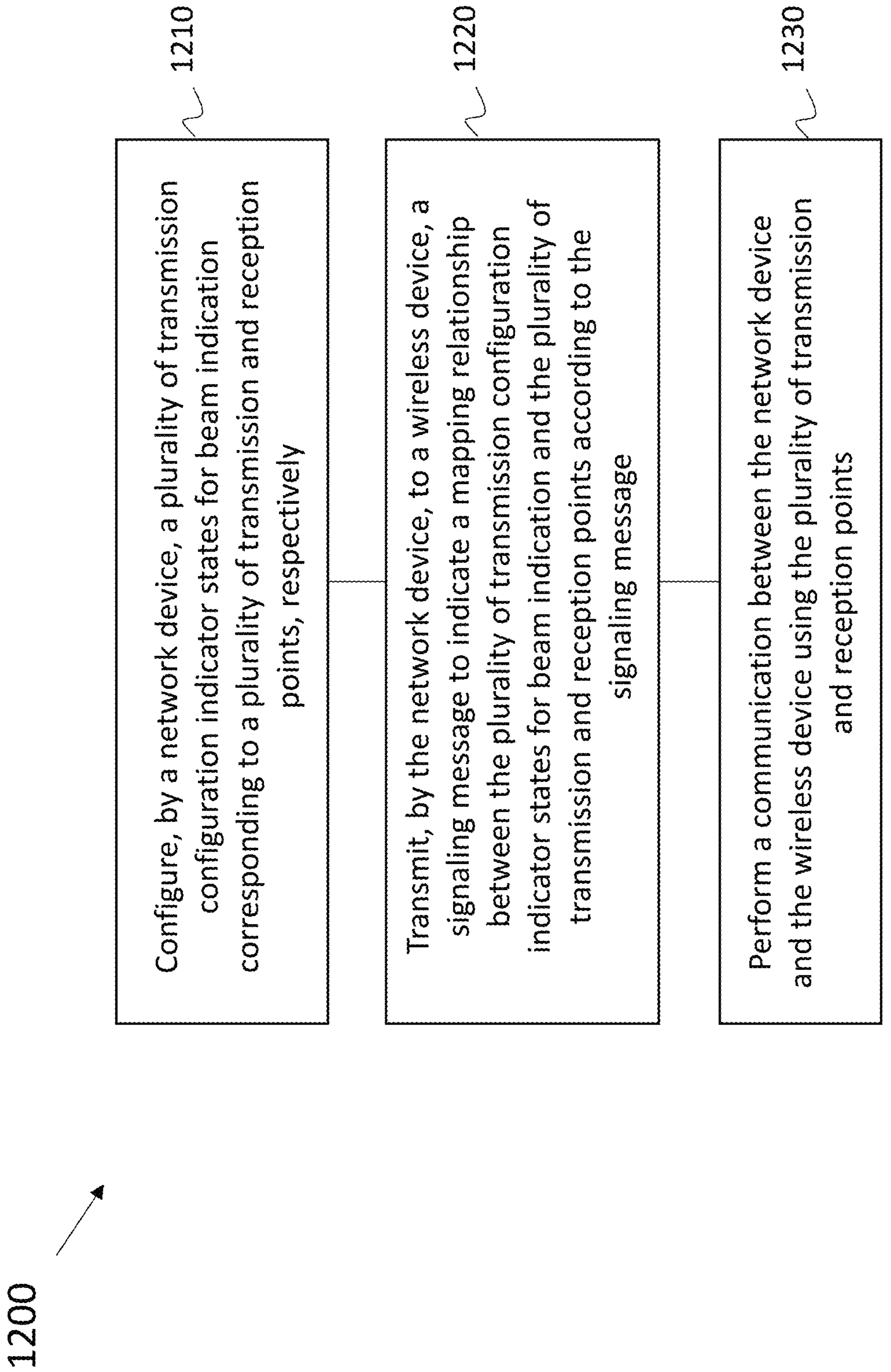
FIG. 12 shows another example of a process for wireless communication based on some example embodiments of the disclosed technology.

FIG. 12 shows another example of a process for wireless communication based on some example embodiments of the disclosed technology.

In some implementations, the process 1200 for wireless communication may include, at 1210, configuring, by a network device, a plurality of transmission configuration indicator states for beam indication corresponding to a plurality of group information, respectively, at 1220, transmitting, by the network device, to a wireless device, a signaling message to indicate a mapping relationship between the plurality of transmission configuration indicator states for beam indication and the plurality of group information according to the signaling message, and at 1230, performing a communication between the network device and the wireless device using the plurality of group information.

The group information may include at least one of information grouping one or more reference signals, transmission and reception point (TRP), resource set, panel, sub-array, antenna group, antenna port group, group of antenna ports, beam group, physical cell index (PCI), TRP index, CORESET pool ID, or UE capability set.

It will be appreciated that the present document discloses techniques that can be embodied in various embodiments to determine downlink control information in wireless networks. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Some embodiments may preferably implement one or more of the following solutions, listed in clause-format. The following clauses are supported and further described in the embodiments above and throughout this document. As used in the clauses below and in the claims, a wireless device may be user equipment, mobile station, or any other wireless terminal including fixed nodes such as base stations. A network device includes a base station including a next generation Node B (gNB), enhanced Node B (eNB), or any other device that performs as a base station.

Clause 1. A method of wireless communication, comprising: receiving, by a wireless device, from a network device, a first parameter indicated by a first signaling message; determining, by the wireless device, a mapping relationship between a plurality of transmission configuration states and a plurality of sets of group information according to the first parameter; receiving, by the wireless device, an indication of whether the transmission configuration states are activated according to at least one first signaling message; receiving, by the wireless device, an indication of the plurality of transmission configuration states according to a second signaling message; and applying, by the wireless device, the plurality of transmission configuration states to a transmission.

Clause 2. The method of clause 1, wherein the plurality of transmission configuration states includes transmission configuration indicator (TCI) states.

Clause 3. The method of clause 1, wherein the first signaling message includes a radio resource control (RRC) message or a medium access control (MAC) control element (MAC-CE) message.

Clause 4. The method of clause 1, wherein the first parameter includes a first index that indicates the mapping relationship between the plurality of transmission configuration states and the plurality of sets of group information.

Clause 5. The method of any of clauses 3-4, wherein the RRC message includes the first index in each pool or sub-pool for transmission configuration indicator (TCI) states.

Clause 6. The method of any of clauses 3-4, wherein the MAC-CE message includes the first index in each MAC-CE message.

Clause 7. The method of any of clauses 5-6, wherein the first index includes at least one of: control resource set pool index; TCI state pool index; physical cell index (PCI); transmission and reception point identifier (TRP-ID); user equipment (UE) capability index; channel state information reference signal (CSI-RS) resource set index; or sounding reference signal (SRS) resource set index.

Clause 8. The method of clause 1, wherein the at least one first signaling message includes a single MAC control element configured to activate one or more transmission configuration indicator codepoints.

Clause 9. The method of clause 8, wherein the one or more transmission configuration indicator codepoints includes a transmission configuration indicator codepoint for joint indication that includes one or more transmission configuration indicator states.

Clause 10. The method of clause 9, wherein each transmission configuration indicator state is applicable to both downlink and uplink transmissions.

Clause 11. The method of clause 10, wherein the single MAC control element further indicates a plurality of flags to indicate an association between a plurality of sets of group information and a plurality of transmission configuration indicator states.

Clause 12. The method of clause 8, wherein one or more transmission configuration indicator codepoints includes a transmission configuration indicator codepoint for separate indication that includes at least one transmission configuration indicator state.

Clause 13. The method of clause 9, wherein each transmission configuration indicator state is applicable to a downlink or uplink transmission.

Clause 14. The method of clause 13, wherein the single MAC control element further indicates a plurality of flags to indicate an association between a plurality of sets of group information and a plurality of transmission configuration indicator states.

Clause 15. The method of clause 13, wherein the single MAC control element further indicates a plurality of flags to indicate an association between a plurality of downlink or uplink transmissions and a plurality of transmission configuration indicator states.

Clause 16. The method of clause 13, wherein indices of reference signal of transmission configuration indicator states are configured as different indices for downlink or uplink transmissions.

Clause 17. The method of clause 1, wherein the at least one first signaling message includes two or more MAC control elements configured to activate one or more transmission configuration indicator codepoints corresponding to two or more sets of group information, respectively.

Clause 18. The method of clause 17, wherein each MAC control element includes a first field to indicate a mapping relationship between the two or more MAC control elements and the two or more sets of group information.

Clause 19. The method of clause 17, wherein the transmission configuration indicator codepoint for separate indication includes at least one transmission configuration indicator state.

Clause 20. The method of clause 19, wherein each transmission configuration indicator state is applicable to a downlink or uplink transmission.

Clause 21. The method of clause 20, wherein the MAC control element further indicates a plurality of flags to indicate an association between a plurality of downlink or uplink transmissions and a plurality of transmission configuration indicator states.

Clause 22. The method of clause 20, wherein indices of reference signal of transmission configuration indicator states are configured as different indices for downlink or uplink transmissions.

Clause 23. The method of clause 1, wherein the second signaling message includes a downlink control information (DCI) signaling that includes a first field to indicate a codepoint that includes one or more transmission configuration indicator states.

Clause 24. The method of clause 23, wherein the one or more transmission configuration indicator states in the codepoint correspond to a transmission and reception point, and wherein the wireless device is configured to switch a first mode for multiple sets of group information to a second mode for single transmission and reception point.

Clause 25. The method of clause 23, wherein the one or more transmission configuration indicator states in the codepoint correspond to a transmission and reception point, and wherein the wireless device is configured to update the transmission and reception point according to the indicated codepoint.

Clause 26. The method of any of clauses 24-25, wherein the wireless device is configured to either switch the first mode for multiple sets of group information to the second mode for single transmission and reception point or update the transmission and reception point by RRC messages.

Clause 27. The method of clause 23, wherein the first filed can be configured greater than 3 bits.

Clause 28. The method of clause 1, wherein the second signaling message includes a downlink control information (DCI) signaling that includes a plurality of fields corresponding to a plurality of sets of group information to indicate a plurality of transmission configuration indicator state codepoints.

Clause 29. A method of wireless communication, comprising: configuring, by a network device, a plurality of transmission configuration indicator states for beam indication corresponding to a plurality of sets of group information, respectively; transmitting, by the network device, to a wireless device, a signaling message to indicate a mapping relationship between the plurality of transmission configuration indicator states for beam indication and the plurality of sets of group information according to the signaling message; and performing a communication between the network device and the wireless device using the plurality of sets of group information.

Clause 30. An apparatus for wireless communication comprising a processor that is configured to carry out the method of any of clauses 1 to 29.

Clause 31. A non-transitory computer readable medium having code stored thereon, the code when executed by a processor, causing the processor to implement a method recited in any of clauses 1 to 29.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of wireless communication, comprising:

receiving, by a wireless device, from a network device, a first parameter indicated by a first signaling message;

determining, by the wireless device, a mapping relationship between a plurality of transmission configuration states and a plurality of sets of group information according to the first parameter, wherein the group information includes physical cell index (PCI) or control resource set (CORESET) pool ID;

receiving, by the wireless device, an indication of whether the transmission configuration states are activated according to at least one first signaling message that includes a single medium access control (MAC) control element configured to activate one or more transmission configuration indicator codepoints;

receiving, by the wireless device, an indication of the plurality of transmission configuration states according to a second signaling message that includes a downlink control information (DCI) signaling that includes a plurality of fields corresponding to a plurality of sets of group information to indicate a plurality of transmission configuration indicator state codepoints; and applying, by the wireless device, the plurality of transmission configuration states to a transmission.

2. The method of claim 1, wherein the first parameter includes a first index that indicates the mapping relationship between the plurality of transmission configuration states and the plurality of sets of group information.

3. The method of claim 1, wherein the one or more transmission configuration indicator codepoints include a transmission configuration indicator codepoint for joint indication, wherein the transmission configuration indicator codepoint includes one or more transmission configuration indicator states.

4. The method of claim 3, wherein each transmission configuration indicator state is applicable to both downlink and uplink transmissions.

5. The method of claim 4, wherein the single MAC control element further indicates a plurality of flags to indicate an association between a plurality of sets of group information and a plurality of transmission configuration indicator states.

6. The method of claim 3, wherein each transmission configuration indicator state is applicable to a downlink or uplink transmission.

7. The method of claim 6, wherein the single MAC control element further indicates a plurality of flags to indicate an association between a plurality of sets of group information and a plurality of transmission configuration indicator states.

8. The method of claim 6, wherein the single MAC control element further indicates a plurality of flags to indicate an association between a plurality of downlink or uplink transmissions and a plurality of transmission configuration indicator states.

9. The method of claim 1, wherein one or more transmission configuration indicator codepoints include a transmission configuration indicator codepoint for separate indication, wherein the transmission configuration indicator codepoint includes at least one transmission configuration indicator state.

10. An apparatus for wireless communication comprising a processor that is configured to carry out a method comprising:

receiving, by a wireless device, from a network device, a first parameter indicated by a first signaling message;

determining, by the wireless device, a mapping relationship between a plurality of transmission configuration states and a plurality of sets of group information according to the first parameter, wherein the group information includes physical cell index (PCI) or control resource set (CORESET) pool ID;

receiving, by the wireless device, an indication of whether the transmission configuration states are activated according to at least one first signaling message that includes a single medium access control (MAC) control element configured to activate one or more transmission configuration indicator codepoints;

receiving, by the wireless device, an indication of the plurality of transmission configuration states according to a second signaling message that includes a downlink control information (DCI) signaling that includes a plurality of fields corresponding to a plurality of sets of group information to indicate a plurality of transmission configuration indicator state codepoints; and applying, by the wireless device, the plurality of transmission configuration states to a transmission.

11. The apparatus of claim 10, wherein the first parameter includes a first index that indicates the mapping relationship between the plurality of transmission configuration states and the plurality of sets of group information.

12. The apparatus of claim 10, wherein the one or more transmission configuration indicator codepoints include a transmission configuration indicator codepoint for joint indication, wherein the transmission configuration indicator codepoint includes one or more transmission configuration indicator states.

13. The apparatus of claim 12, wherein each transmission configuration indicator state is applicable to both downlink and uplink transmissions.

14. The apparatus of claim 13, wherein the single MAC control element further indicates a plurality of flags to indicate an association between a plurality of sets of group information and a plurality of transmission configuration indicator states.

15. The apparatus of claim 10, wherein one or more transmission configuration indicator codepoints include a transmission configuration indicator codepoint for separate indication, wherein the transmission configuration indicator codepoint includes at least one transmission configuration indicator state.

16. The apparatus of claim 15, wherein each transmission configuration indicator state is applicable to a downlink or uplink transmission.

* * * * *